Aug. 14, 1956     A. D. LEWIS     2,758,629
APPARATUS FOR MANUFACTURING MULTIPLE
WIRE STRANDED HELICAL SPRINGS
Filed Sept. 26, 1951     3 Sheets-Sheet 1
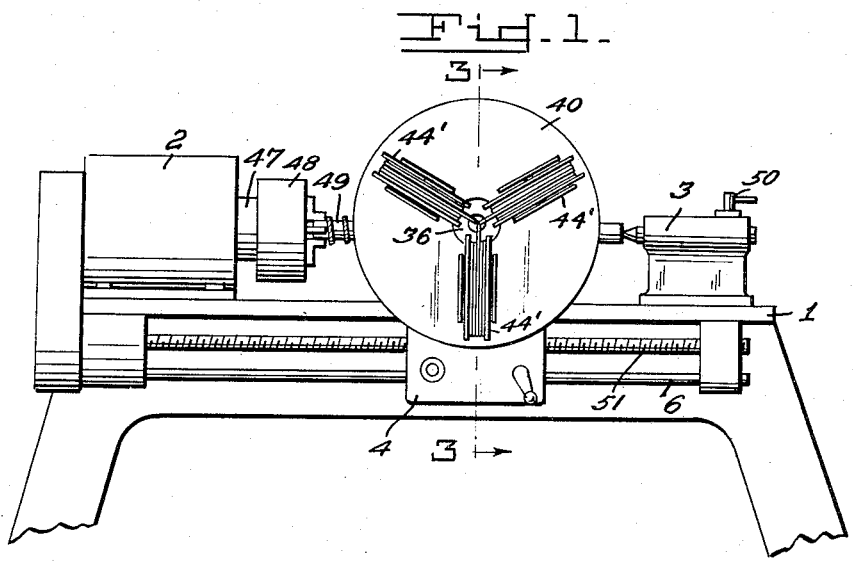
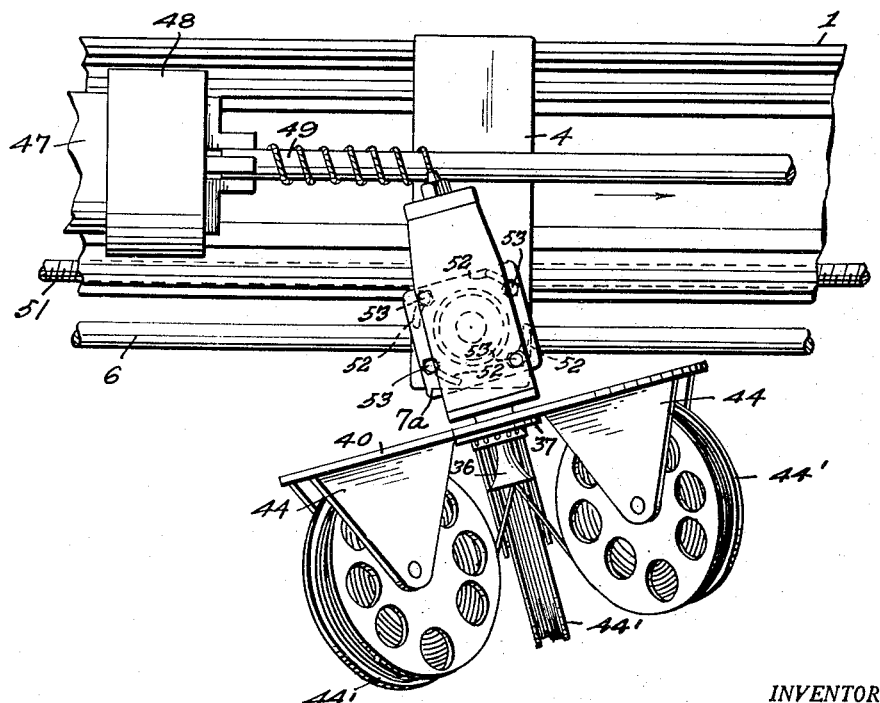
INVENTOR.
Allen D Lewis

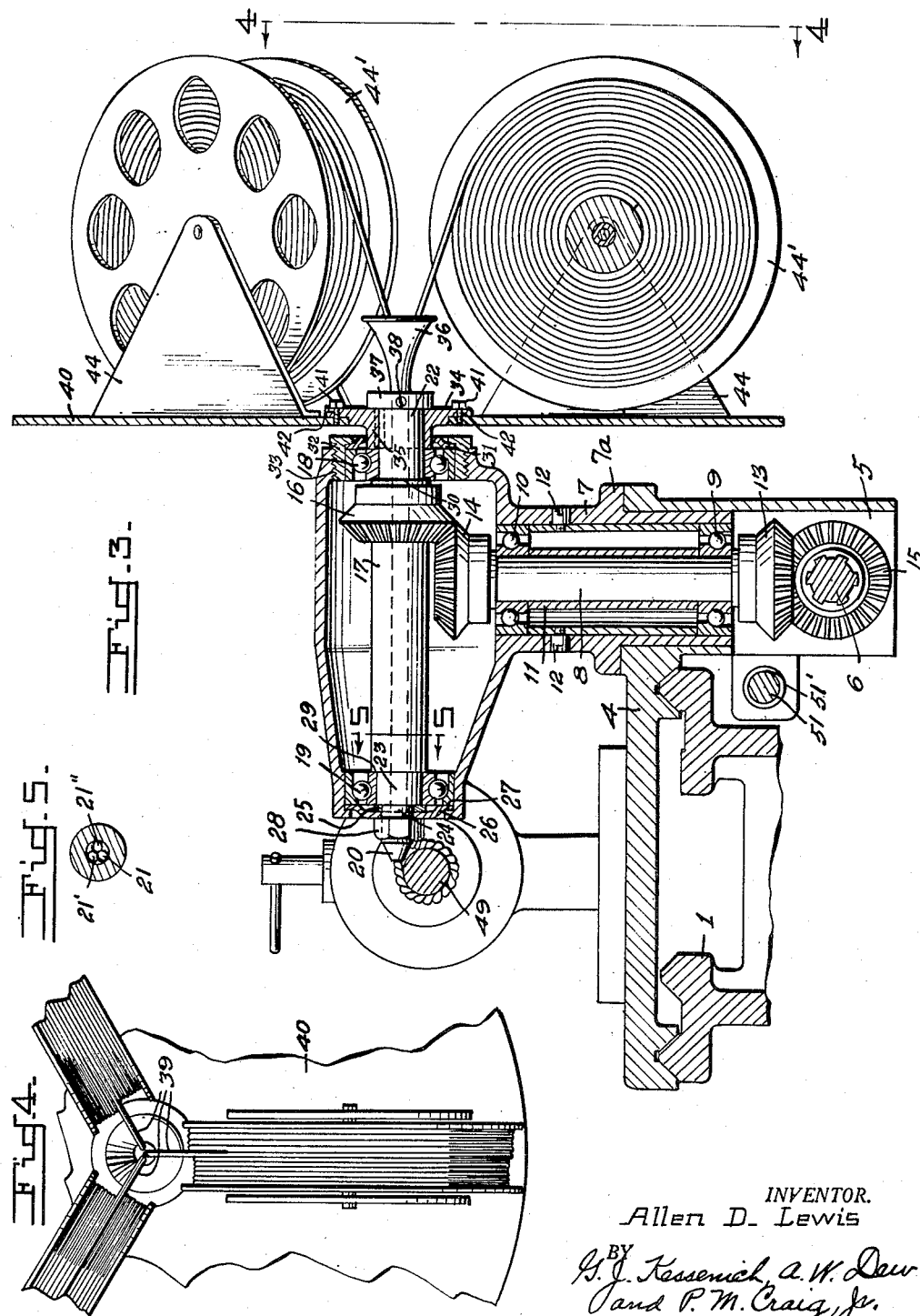

INVENTOR.
Allen D. Lewis

United States Patent Office 2,758,629
Patented Aug. 14, 1956

2,758,629

APPARATUS FOR MANUFACTURING MULTIPLE WIRE STRANDED HELICAL SPRINGS

Allen D. Lewis, Mantua, N. J.

Application September 26, 1951, Serial No. 248,438

4 Claims. (Cl. 153—2)

(Granted under Title 35, U. S. Code (1952), sec. 266)

The invention described in the specification and claims may be manufactured and used by or for the Government for governmental purposes without the payment to me of any royalty thereon.

The present invention relates to a novel process and machine for manufacturing helical springs made of multiple wires, stranded together, which are hereinafter termed "stranded-wire" springs. More particularly, the present invention relates to a novel and improved process and machine for manufacturing helical, stranded wire springs, wherein the stranding and coiling operations are performed simultaneously and wherein the wires are fed to the forming element in accordance with the instantaneous demand of the operation.

It is accordingly an object of the present invention to provide a novel and improved process and machine for the manufacture of helical, stranded-wire springs.

It is another object of the present invention to provide a new process and machine for manufacturing helical, stranded-wire springs by simultaneously stranding and coiling the wires into such springs.

It is a further object of the present invention to provide a new and improved process and machine for the manufacture of helical, stranded-wire springs, functionally superior to the prior art stranded-wire springs, which results in greater uniformity of the product, and which permits varying the pitch of the strand in the various portions of the spring.

It is a still further object of the present invention to provide a new process and machine for the manufacture of helical, stranded-wire springs, which have a fatigue life unimpaired by stress deversals in the forming process and of the highest value permitted by the material properties of the individual wires.

It is still another object of the present invention to provide a novel process and machine for the manufacture of helical, stranded-wire springs whereby uniform tensile stress is imposed on the individual wires at their point of deformation to produce springs the load deflection characteristics of which are the same for springs of identical design data.

These and other objects and advantages of the present invention will become apparent from the following drawings taken together with the accompanying description, which show for purposes of illustration only one preferred embodiment, and wherein:

Figure 1 is a side elevational view of a machine in accordance with the present invention for the manufacture of stranded-wire springs in a single operation;

Figure 2 is a top view of the machine shown in Figure 1 with the turret rotated parallel to the pitch line of the spring;

Figure 3 is a sectional view of the machine taken along lines 3—3 of Figure 1;

Figure 4 is a fragmentary view of the spider and storage spools taken along lines 4—4 of Figure 3;

Figure 5 is a sectional view of the hollow spinner shaft taken along lines 5—5 of Figure 3;

It is well-known that stranded-wire springs possess inherent shock absorbing and damping properties. By virtue of these properties the stranded-wire springs offer a marked superiority over single wire, helical springs as regards fatigue life in all applications in which the springs are subjected to load impacts. Accordingly they have been used advantageously in such applications as drive springs in machine guns and other ordnance devices.

The prior art manufacture of stranded-wire springs involves two separate operations. Firstly, in the stranding operation, a number of single wires are twisted together to form the so-called "strand," which is similar to the operation employed in the manufacture of wire rope. Secondly, in the coiling operation of the then existing strand, a helical spring is formed by coiling the strand on an arbor, or in a coiling die. The latter operation is the same as is used in the normal production of helical springs. Different types of stranded wire which may be used in connection with the manufacture of stranded-wire springs are illustrated in Figures 6-11.

Figure 6:
Figure 6 shows a strand composed of three wires without a core wire.
Figure 7:
Figure 7 is a cross sectional view of the strand shown in Figure 6 taken at right angle with the longitudinal axis thereof.
Figure 8:
Figure 8 shows a strand composed of seven wires, one of which is a core wire.
Figure 9:
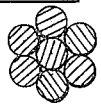
Figure 9 is a cross sectional view of the strand shown in Figure 8 taken at right angle with the longitudinal axis thereof.
Figure 10:
Figure 10 shows a strand composed of a core wire covered by two wrapping wires.
Figure 11:
Figure 11 is a cross sectional view of the strand shown in Figure 10 taken at right angle with the longitudinal axis thereof.
Figure 12:
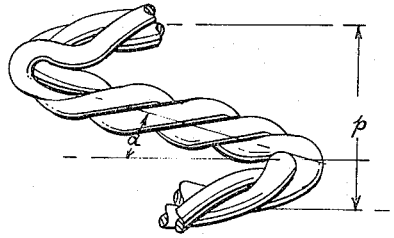
Figure 12 is a side elevational view of one coil of a helical spring formed of the three wire strand shown in Figures 6 and 7.
Figure 13:
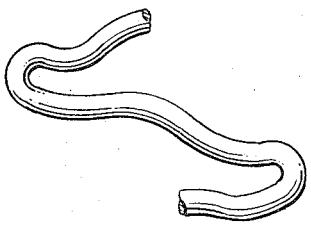
Figure 13 is an individual wire of the coil shown in Figure 12.
Figure 14:
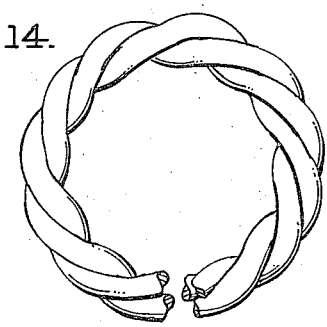
Figure 14 is a side elevational view of a coil consisting of a single wire taken from the stranded-wire spring shown in Figures 12 and 13.
Figure 15:
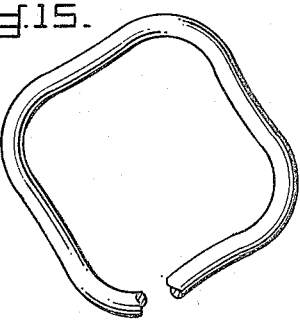
Figure 15 is an individual wire of the coil shown in Figure 14.

The defects of performing the manufacture in two distinct operations, as outlined above, which will result in undesirable properties of the stranded-wire springs and which the present invention seeks to overcome, will be analyzed with reference to Figures 12-15, which relate to a springmade of a three-wire strand of the type shown in Figures 6 and 7. In the coiling operation, which constitutes the second step of the prior art method of manufacture, the initially straight strand is deformed in such a manner that the center point of the strand cross-section described a helix characterized by the coil helix angle, conveniently shown in the drawing as α, which is usually considerably less than 45 degrees, and by a corresponding coil helix pitch, conveniently shown in the drawing as p, as illustrated in Figures 12 and 13. The shape assumed by the individual wires, shown in Figures 14 and 15, is a spatial curve which may be termed a compound helix, the angle, pitch and radius of which varies from point to point in the wire. It is quite obvious that during the coiling process of the straight strand, some points in the wire have their initial deformation reduced while other points have their deformation increased. Likewise, those portions in the wire which are farthest from the arbor on which the wire is wound, are subjected to permanent elongation, while those portions, which are nearest to the arbor, are subjected to permanent compressive deformation, The net result of these deformations is that in the non-loaded condition of the spring various points in the wires are under non-uniform stress and exhibit a non-uniform deformation history. Consequently the originally tightly wound wire strand becomes loose at points where the wire lies at the inside of the coil adjacent the arbor. This loosening-up occurs to a random extent, causing a discrepancy in the load deformation characteristics of springs of identical design data. Furthermore, the fatigue life of the spring is adversely affected by the variation of the stress condition of the wire from point to point. A further disadvantage of the prior art method of production is the tendency of the spring to unwind, which is caused by the variations of stress in the individual wires from point to point. The same disadvantages and unsatisfactory results are obtained by this method of manufacture of other types of strand, such as the ones shown in Figures 8–11.

The process and machine for manufacturing helical, stranded-wire springs in accordance with the present invention wherein the stranding and coiling operations are performed simultaneously, seeks to eliminate the aforementioned disadvantages and defects of the currently available helical, stranded-wire springs, and to provide improved helical, stranded-wire springs with the individual wires thereof undergoing their final deformation at a given point without subsequent stress reversal, thereby producing uniform tensile stress at the point of deformation and lessening the tendency to unwind.

Referring now more particularly to the drawings wherein like reference numerals are used to designate like parts, the machine in accordance with the present invention, which resembles in its general arrangement a lathe, is illustrated in Figure 1 and comprises a bed 1, a headstock 2, a tailstock 3 and a carriage 4. Reference numeral 5 designates an apron formed by carriage 4, which supports layshaft 6. Turret 7 is rotatably mounted within and supported by carriage 4. Turret 7 houses vertical shaft 8 journaled in bearings 9 and 10 which are spaced from each other by means of separator 11 as shown more fully in Figure 3 of the drawing. Machine screws 12 fasten turret 7 to separator 11. Bevel gears 13 and 14 are fixedly attached to vertical shaft 8 in any conventional manner, as by press fit, keying, or any other fastening means. Bevel gear 15 is splined to layshaft 6 to partake of the longitudinal movement of turret 7 since it is confined in space between apron 5 and bevel gear 13, while rotating as a unit with shaft 6. Bevel gear 14, which rotates with vertical shaft 8, meshes another bevel gear 16 which is fixedly attached to spinner shaft 17 in any conventional manner; spinner shaft 17 is journaled in bearings 18 and 19 supported by turret 7, and is hollow throughout its entire length. The front end of spinner shaft has a nozzle 20 removably fixed thereto and having a number of orifices 21, 21' and 21'' through which the individual wires pass, as is best shown in Figure 5 of the drawing. In the illustrated embodiment, which uses three-wire strands, three such orifices are utilized, it being understood however that this number with the number of strands used in the particular spring being wound. Two sections 22 and 23 of the spinner shaft 17 have reduced outside diameters which engage bearings 18 and 19; section 24 of spinner shaft 17 adjoining section 23 has a still further reduced outside diameter, which terminates in nozzle 20. Washer 25 and spring washer 26 have a central bore sufficiently large to permit passage therethrough of shaft section 24. Spring washer 26 rests against abutment 27 formed by turret 7. A nut 28 threadably engages a corresponding thread provided on the outside of section 24 of spinner shaft 17. It is thus seen that bearing 19 is held in place on one side by washer 25, spring washer 26 and nut 28, and on the other side by the shoulder 29 formed by the abrupt change in diametrical dimension between section 23 and the main portion of spinner shaft 17. Bearing 18 is held in place on one side by the rear face 30 of bevel gear 16 and on the other side by spring washer 31 and end cap 32, the externally threaded portion of which engages the internally threaded portion 33 provided in turret 7. However it is understood that any other conventional method, such as press fit, etc., may be used to fasten end cap 32 to turret 7. A hub 34 having a sleeve portion 35 with a central bore of sufficiently large diametrical dimension to permit passage therethrough of portion 22 of spinner shaft 17, is keyed to portion 22 to rotate as a unit therewith. In order to prevent excessive wear of shaft portion 22 and of hub 34, suitable bearings or bushings (not shown) may be used therebetween. Funnel 36 having a collar 37 which fits over shaft portion 22, is secured to shaft portion 22 by means of one or more set screws 38, so as to rotate funnel 36 with spinner shaft 17. Funnel 36 may be provided on its inner surface with guide grooves 39, as shown more clearly in Figure 4 to guide the wires through the rotating funnel 36.

Spider 40 is fastened to hub 34 by means of a plurality of circumferentially spaced machine screws 41 to thereby rotate as a unit with shaft 17. Spider 40 carries a plurality of pairs of brackets 44, the number of which is determined by the number of strands in the spring being wound.

Referring again to Figure 1, headstock 2 comprises a driving spindle 47 which carries the chuck 48, in which arbor 49 is clamped. The other end of arbor 49 is rotatably supported by tailstock 3 which is clamped in position on the ways by means of clamp 50 in a manner well-known with conventional lathes. Spindle 47, chuck 48 and arbor 49 are driven by any conventional prime mover (not shown), such as an electric motor, through appropriate gearing mechanism which may be of the variable speed type. Leadscrew 51, which is geared to the headstock spindle 47 by means of a gear train (not shown) composed of interchangeable gears, is thus indirectly driven by the same prime mover. Carriage 4 together with turret 7, which is analogous to the tool post of a conventional lathe, are moved along the bed 1 upon rotation of leadscrew 51 which engages a corresponding split thread 51' in carriage 4. It is obvious that by changing the gearing ratio between spindle 47 and leadscrew 51, the rate of advance of carriage 4 relative to the speed of revolution of spindle 47 may be changed at will, whereby any desired pitch of the coil spring may be obtained.

Layshaft 6, which is also geared to spindle 47 by means of a gear train (not shown) composed of interchangeable gears, is therefore indirectly driven by the same prime mover. Moreover it is obvious that by changing the gearing ratio between spindle 47 and layshaft 6 the number of twists of strand for every complete turn of the spring coil may be varied in any desired predetermined number.

In order to feed the wires emanating from nozzle 20 to arbor 49 substantially in such a direction that the center line of spinner shaft 17 and nozzle 20 is tangent to the pitch line of the spring to be coiled, turret 7 may be rotated to a limited degree about its vertical axis by the provision of elongated slots 52 in the base 7a of the turret which receive locking screws 53 as shown best in Figure 2 of the drawing.

*Operation*

In setting up the machine, the ends of the wires taken from reels 44' are threaded through funnel 36, through the hollow interior of spinner shaft 17 and then through nozzle 20. The loose ends of the wires are next fastened to one end of arbor 49, and the desired gearing ratio between spindle 47, leadscrew 51 and spinner shaft 17 is established to produce the desired pitch of coil and the desired number of strand twists per coil. Turret 7 may also be rotated to align the center line of spinner shaft 17 and of nozzle 20 with the pitch line of the spring and locked in adjusted position by screws 53.

After starting the prime mover, spindle 47, layshaft 6 and leadscrew 51 which are mechanically connected thereto, begin to rotate at their respective, predetermined speeds. Arbor 49 which rotates in synchronism with spindle 47, pulls the three wires from reels 44' through spinner shaft 17 and nozzle 20. Spinner shaft 17 together with nozzle 20 and reel support 40 are rotated through appropriate gearings (not shown) by spindle 47, layshaft 6, bevel gears 15 and 13, vertical shaft 8, and bevel gears 14 and 16. The rotation of nozzle 20 brings any one given wire at some times close to the arbor where the pulling speed is lowest, and at other times to the outer periphery of the spring where the pulling velocity is highest. Thus the pulling velocity on each wire fluctuates between a maximum and a minimum value as the nozzle 20 makes one complete rotation. A frictional load is exerted on the individual wires by the inside of nozzle 20 and by grooves 39 in funnel 36 so that the unwinding of the wires from reels 44' is resisted whereby the feeding velocity of each wire is automatically adjusted to the instantaneous demand thereof. The friction can be further augmented by additional braking means on the individual wires, or on the reels 44', or on both, so as to produce the desired tension on individual wires.

Nozzle 20 has a number of orifices 21, 21' 21" through which the individual wires must pass. Since these orifices 21, 21', 21" merge together at the exit side of nozzle 20, the wires emerge again after passage therethrough near the surface of arbor 49 in a direction approximately tangent to the spring helix to be formed. By virtue of this arrangement the individual wires are kept separate until after their emergence from nozzle 20, and only after they pass through the nozzle are they twisted together in the form of a strand by the rotation of spinner shaft 17 and nozzle 20.

Since leadscrew 51, which is driven by spindle 47 through appropriate gear trains (not shown), rotates at the same time as spindle 47 and layshaft 6, carriage 4 together with turret assembly 7 will move lengthwise along bed 1 of the machine; the speed of this lengthwise movement relative to the speed of rotation of spindle 47 determines the pitch angle of the coil spring to be formed.

It is thus seen that the essential features of this invention are accomplished by feeding the wires to the point of tangency with the arbor and by performing the simultaneous stranding and coiling operations at that point.

It may also be readily visualized that springs composed of any type of strand, either with or without core wires as illustrated in Figures 8–11, may be produced by mounting an appropriate number of wire reels on spider 40 and by attaching a correspondingly formed nozzle to the other end of spinner shaft 17. In all cases the essential requirement of bringing the individual wires together and of forming the strand as close as possible at the point of tangency with the arbor must be fulfilled in order to obtain the stranded-wire, helical springs having uniform characteristics and properties.

The stiffness of the stranded-wire, helical spring is determined, to a certain extent, by the ratio of the number of strand per turn of coil whereby the stiffness increases with numerical increases in the ratio. It has further been found desirable in certain applications to form the coils of the spring to a non-uniform stiffness, as for instance by making the spring stiffer at the two ends than in the middle portion. It is quite obvious that this may be achieved by changing the ratio of number of turns of strand per turn of coil, which may be readily accomplished by changing the gearing ratio between layshaft 6 and arbor 49 during the formation of a single spring whereby relative variable rotational speed is produced therebetween. Similarly the pitch of the spring may be varied by changing the gearing ratio between arbor 49 and leadscrew 51 whereby relative variable rotational speed is produced therebetween. The change of gearing ratios is well known in the construction of machine tools, as for instance in the construction of some automatic lathes, and is not deemed necessary to be shown and described herein in their detached arrangements.

Moreover it has been found desirable in certain application to impart a twist to the individual wires before they are fed to the stranding point. If the twist of the wire is in sense opposite to the sense of the twist of the strand then the tendency of the strand to unravel is counteracted thereby. This may be realized in practice by mounting reels 44' on platforms journalled in spider 40, and rotatable about an axis coincident with the unreeling wire, and by rotating the platforms in a definite ratio to the rotation of the spinner shaft 17 by means of a planetary drive.

Although a preferred embodiment of the invention is shown and described herein it is to be understood that many modifications and variations may be made therein without departing from the spirit and scope thereof as set forth in the appended claims.

I claim:

1. In a machine for producing stranded wire helical springs, said machine being of the type having an arbor rotatably driven between a headstock and tailstock and a carriage driven by a lead screw parellel to the axis of rotation of said arbor, comprising, a turret pivotally mounted in said carriage for movement about an axis normal to and offset from the axis of the arbor, a hollow spinner shaft journaled in said turret whereby said shaft may be adjusted about an axis substantially collinear with the pitch line of a spring to be formed, a nozzle integral with said shaft at the end thereof adjacent a point of tangency with said arbor and having a plurality of orifices therethrough, a spider integral with said shaft at the end thereof remote from said arbor, a plurality of wire reels journaled on said spider on respective axes parallel to the plane of said spider, each said reel being adapted to carry a coil of wire thereon to be unwound from said reel by said arbor and drawn through said hollow shaft and a respective one of said orifices and stranded at a point of tangency with said rotating arbor, and means rotating said arbor, translating said carriage and rotating said hollow shaft in predetermined timed relation.

2. In a machine for producing stranded wire helical springs from a plurality of single wires comprising, a frame, an arbor journaled in said frame for rotation on a first axis fixed relatively thereto, a carriage mounted on said frame for guided translation parallel with and along said first axis, a turret journaled on said carriage for rotation on a second axis perpendicular to and offset from said first axis, a hollow spinner shaft journaled in said turret for rotation on a third axis substantially coplanar with said second axis, a nozzle integral with said hollow shaft at the end thereof adjacent said arbor and at a point of tangency therewith, said nozzle having a plurality of orifices therethrough, a spider integral with said hollow shaft at the end thereof remote from said arbor, a plurality of wire reels journaled on said spider on respective axes, said reels each being adapted to mount a respective coil of wire thereon, each wire passing through said hollow shaft and a respective orifice in said nozzle to be simultaneously stranded at the point of tangency with said arbor and wound thereon, and means rotating said arbor, translating said carriage and rotating said hollow shaft, nozzle and spider, all in predetermined timed relation.

3. A machine for producing helical stranded wire helical springs from a plurality of single wires comprising a frame, a headstock and tailstock mounted on said frame, an arbor supported and rotatably driven by said headstock and tailstock, a carriage driven by a lead screw parellel to the axis of rotation of said arbor on said frame, a turret releasably journaled in said carriage to align said turret with the pitch line of the spring to be coiled, a hollow spinner shaft journaled in said turret for rotation about an axis substantially perpendicular to the axis of rotation of said arbor, a nozzle integral with said shaft at the end thereof adjacent said arbor at a point of tangency therewith, said nozzle having a plurality of orifices therethrough, a spider integral with said shaft at the end thereof remote from said arbor, a plurality of wire reels journaled on said spider on respective axes parallel to said spider, each of said reels carrying a coil of wire thereon to be unwound from said reels, drawn through said hollow shaft and respective orifices by said arbor, and stranded by said turret at a point of tangency with said arbor simultaneously with the beginning of the coiling operation, and a gear train driven by the power means for said machine to rotate said nozzle and spider in timed relation with said arbor and said carriage.

4. The stranding and coiling apparatus as defined in claim 3 having a funnel integral with said hollow shaft and coplanar therewith to frictionally guide the wires from said reels to the opening in said shaft.

References Cited in the file of this patent

UNITED STATES PATENTS

| Number | Name | Date |
|---|---|---|
| 237,397 | Lewthwaite | Feb. 8, 1881 |
| 749,752 | Schoonmaker | Jan. 19, 1904 |
| 1,050,363 | Harter | Jan. 14, 1913 |
| 1,266,349 | Timmis | May 14, 1918 |
| 1,638,024 | Woodrow | Aug. 9, 1927 |
| 1,988,295 | Berry | Jan. 15, 1935 |
| 1,990,514 | Angell | Feb. 12, 1935 |
| 2,156,652 | Harris | May 2, 1939 |
| 2,182,330 | Windeler | Dec. 5, 1939 |
| 2,218,104 | Brignall | Oct. 15, 1940 |
| 2,365,661 | Winslow | Dec. 19, 1944 |